United States Patent
Wang et al.

(10) Patent No.: US 9,621,518 B2
(45) Date of Patent: *Apr. 11, 2017

(54) METHOD AND APPARATUS FOR PROVISIONING TRAVERSAL USING RELAYS AROUND NETWORK ADDRESS TRANSLATION (TURN) CREDENTIAL AND SERVERS

(71) Applicant: Futurewei Technologies, Inc., Plano, TX (US)

(72) Inventors: Xiaobo Wang, San Jose, CA (US); Ren Huipeng, Santa Clara, CA (US); Zhang Xuwu, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 33 days.

This patent is subject to a terminal disclaimer.

(21) Appl. No.: 14/461,162

(22) Filed: Aug. 15, 2014

(65) Prior Publication Data
US 2016/0050179 A1    Feb. 18, 2016

(51) Int. Cl.
*G06F 9/00* (2006.01)
*H04L 29/06* (2006.01)
*H04L 29/12* (2006.01)

(52) U.S. Cl.
CPC ........ *H04L 63/029* (2013.01); *H04L 61/2575* (2013.01); *H04L 61/2589* (2013.01);
(Continued)

(58) Field of Classification Search
None
See application file for complete search history.

(56) References Cited

U.S. PATENT DOCUMENTS 7,620,033 B2    11/2009  Chu et al.
8,725,885 B1 *   5/2014  Ryner .................. G06F 21/45
                                                  709/228
(Continued)

OTHER PUBLICATIONS

R. Mahy et al., "Traversal Using Relays around NAT (TURN): Relay Extensions to Session Traversal Utilities for NAT (STUN)", Internet Engineering Task Force (IETF), Apr. 2010,67 pages.
(Continued)

*Primary Examiner* — Farid Homayounmehr
*Assistant Examiner* — Olanrewaju Bucknor
(74) *Attorney, Agent, or Firm* — Schwegman, Lundberg & Woessner, P.A.

(57) ABSTRACT

Various disclosed embodiments include methods and systems for provisioning traversal using relays around network address translation (TURN) credentials and servers for network address translation/firewall (NAT/FW) traversal via a Voice-over-Internet-protocol/Web Real-Time Communication (VoIP/WebRTC) signaling channel. The method comprises receiving, at a signaling gateway, a signaling message from a first electronic device (ED) when the first electronic device registers with the signaling gateway or sends other signaling messages for requesting a TURN credential. The signaling message comprises one or more signaling message parameters. The signaling message further comprises a request that the signaling gateway generate a TURN credential for the first electronic device, the TURN credential associated with the one or more signaling message parameters. The method comprises sending, from the signaling gateway, the TURN credential to the first electronic device.

26 Claims, 6 Drawing Sheets

(52) U.S. Cl.
CPC ...... *H04L 65/1046* (2013.01); *H04L 65/1066* (2013.01); *H04L 65/1069* (2013.01); *H04L 65/1073* (2013.01); *H04L 61/1529* (2013.01); *H04L 61/2514* (2013.01); *H04L 61/2564* (2013.01); *H04L 61/6004* (2013.01)

(56) References Cited

U.S. PATENT DOCUMENTS

| | | | |
|---|---|---|---|
| 8,752,161 B1* | 6/2014 | Thai | H04L 65/105 370/389 |
| 2007/0022289 A1* | 1/2007 | Alt | H04L 63/0272 713/168 |
| 2008/0181239 A1* | 7/2008 | Wood | H04L 63/083 370/401 |
| 2009/0094684 A1* | 4/2009 | Chinnusamy | H04L 63/0281 726/4 |
| 2010/0257276 A1* | 10/2010 | Savolainen | H04L 29/12386 709/230 |
| 2011/0149956 A1* | 6/2011 | Alt | H04L 63/0281 370/352 |
| 2013/0111043 A1 | 5/2013 | McGuire | |
| 2013/0246654 A1* | 9/2013 | Cicic | H04L 45/00 709/238 |
| 2013/0308628 A1* | 11/2013 | Marueli | H04L 65/1076 370/352 |
| 2014/0181933 A1* | 6/2014 | Sanjeev | H04L 63/0823 726/7 |
| 2014/0282903 A1* | 9/2014 | Singh | H04L 63/08 726/4 |
| 2014/0289791 A1* | 9/2014 | Acharya | H04L 63/0236 726/1 |
| 2015/0188882 A1 | 7/2015 | Wang et al. | |
| 2015/0188902 A1* | 7/2015 | Yoakum | H04L 63/083 726/7 |
| 2015/0281344 A1* | 10/2015 | Grootwassink | H04L 67/104 713/168 |

OTHER PUBLICATIONS

J. Uberti, "A Rest API for Access to TURN Services", Network Working Group, Jul. 8, 2013, 7 pages.
M. Petit-Huguenin, et al., "Traversal Using Relays around NAT (TURN) Uniform Resource Identifiers", Internet Engineering Task Force (IETF), Nov. 2013, 9 pages.
T. Reddy, et al., "TURN Extensions for Third Party Authorization", TRAM Internet-Draft, May 12, 2014, 16 pages.
S. Nandakumar, et al., "URI Scheme for the Session Traversal Utilities for NAT (STUN) Protocol", Internet Engineering Task Force (IETF), Nov. 2013, 9 pages.

* cited by examiner

FIG. 1
(PRIOR ART)

FIG. 2A
(PRIOR ART)
STEP ONE

FIG. 2B
(PRIOR ART)
STEP TWO

FIG. 2C
(PRIOR ART)
STEP THREE

METHOD AND APPARATUS FOR PROVISIONING TRAVERSAL USING RELAYS AROUND NETWORK ADDRESS TRANSLATION (TURN) CREDENTIAL AND SERVERS

CROSS-REFERENCE TO RELATED APPLICATION

This application is related to U.S. patent application Ser. No. 14/142,465 filed on Dec. 27, 2013, the content of which is hereby incorporated by reference in its entirety.

TECHNICAL FIELD

The present disclosure relates generally to provisioning TURN credentials.

BACKGROUND

A Network Address Translation (NAT) device modifies an internet protocol (IP) header when a packet transits across the NAT device. NAT devices are widely deployed at home/enterprise networks and the internet. NAT devices, however, break Voice over Internet Protocol (VoIP) calls.

Some firewalls are configured to block User Datagram Protocol (UDP) and only allow Hypertext Transfer Protocol (HTTP) (TCP 80) or HTTP Secure (HTTPS) (TCP 443) to pass, usually for security reasons. Because voice packets are sent on UDP, firewalls that block UDP also block voice traffic. To summarize, both NAT and firewalls that block UDP can block media communication in VoIP and result in one-way voice or no voice.

It would therefore be desirable to provide improved NAT/Firewall traversal.

SUMMARY

According to one embodiment, there is provided a method for traversal using relays around network address translation (TURN) credential and server provisioning in a communication system, where the communication system comprises a signaling gateway, a TURN server, and an electronic device. The method comprises receiving, at the signaling gateway, a signaling message from a first electronic device (ED) when the first electronic device registers with the signaling gateway or sends other signaling messages for requesting TURN credential. The signaling message comprises one or more signaling message parameters. The signaling message further comprises a request that the signaling gateway generate a TURN credential for the first ED. The TURN credential is associated with the one or more authentication message parameters. The method comprises sending, from the signaling gateway, the TURN credential to the first ED.

In another embodiment, there is provided an electronic device for traversal using relays around network address translation (TURN) credential and server provisioning in a communication system, where the communication system comprises a signaling gateway and a TURN server. The electronic device comprises a processor and memory coupled to the processor. The electronic device is configured to send, to a signaling gateway, a signaling message. The signaling message comprises one or more signaling message parameters. The signaling message further comprises a request that the signaling gateway generate a TURN credential for the first ED. The TURN credential is associated with the one or more signaling message parameters. The electronic device is configured to receive, from the signaling gateway, the TURN credential.

In another embodiment, there is provided a signaling gateway. The signaling gateway comprises a processor and memory coupled to the processor. The signaling gateway is configured to receive a signaling message from a first electronic device (ED). The signaling message comprises one or more signaling message parameters. The signaling message further comprises a request that the signaling gateway generate a TURN credential for the first ED. The TURN credential is associated with the one or more authentication message parameters. The signaling gateway is configured to send the TURN credential to the first ED.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
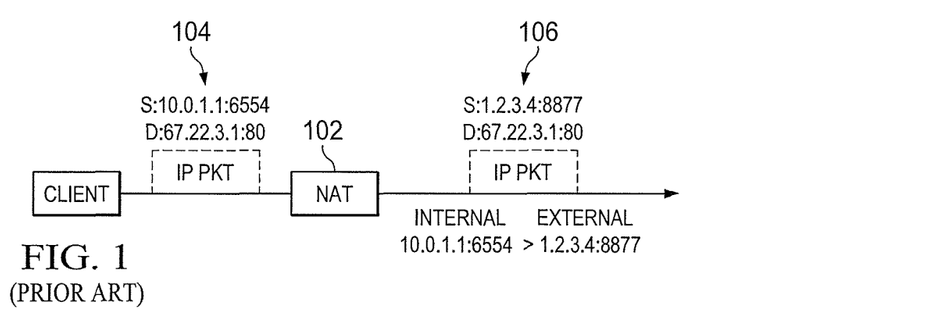
FIG. 1 illustrates a NAT device that translates a source IP/port of a packet to a new value.

An example NAT device 102 is shown in FIG. 1 where the NAT device 102 translates the source IP/port of a packet 104 to a new value 106 (e.g., 10.0.1.1:6554→1.2.3.4:8877) as the packet transits across it. NAT devices can solve an Internet Protocol version 4 (IPv4) address shortage problem by reusing private IP addresses. NAT devices also hide internal network topologies from outside for security protection. NAT devices, however, break Voice over Internet Protocol (VoIP) calls. The NAT breaks VoIP calls because the originating UE sends its private address (un-NATted) as a media address in the signaling message when the call is being set up. Because private addresses are not routable in public networks, media packets sent to a private address will be discarded by routers or switches on the path and do not reach the peer UE.

Figure 2A:
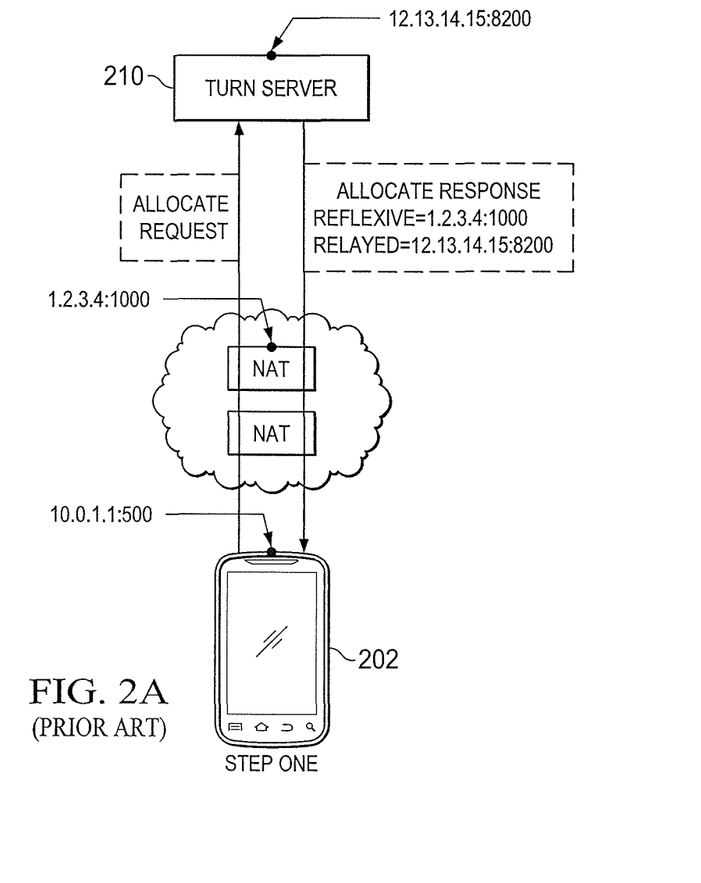
FIGS. 2A-2C illustrate diagrams of ICE/STUN/TURN NAT/Firewall traversal solutions for P2P communication.
Figure 2B:
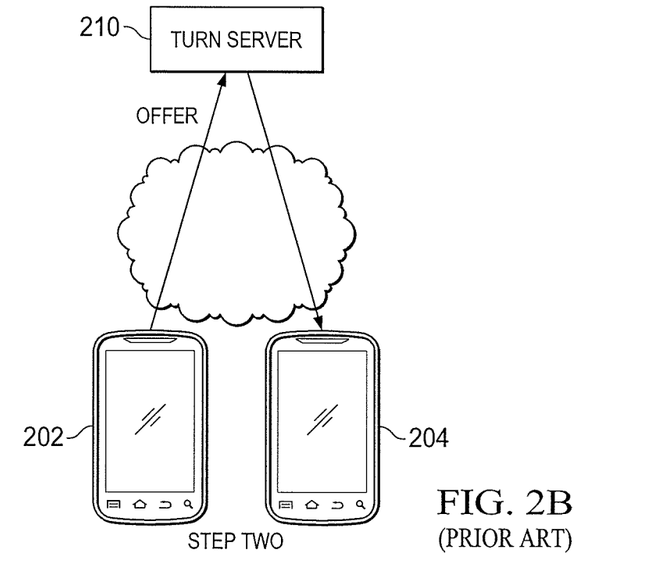
Figure 2C:
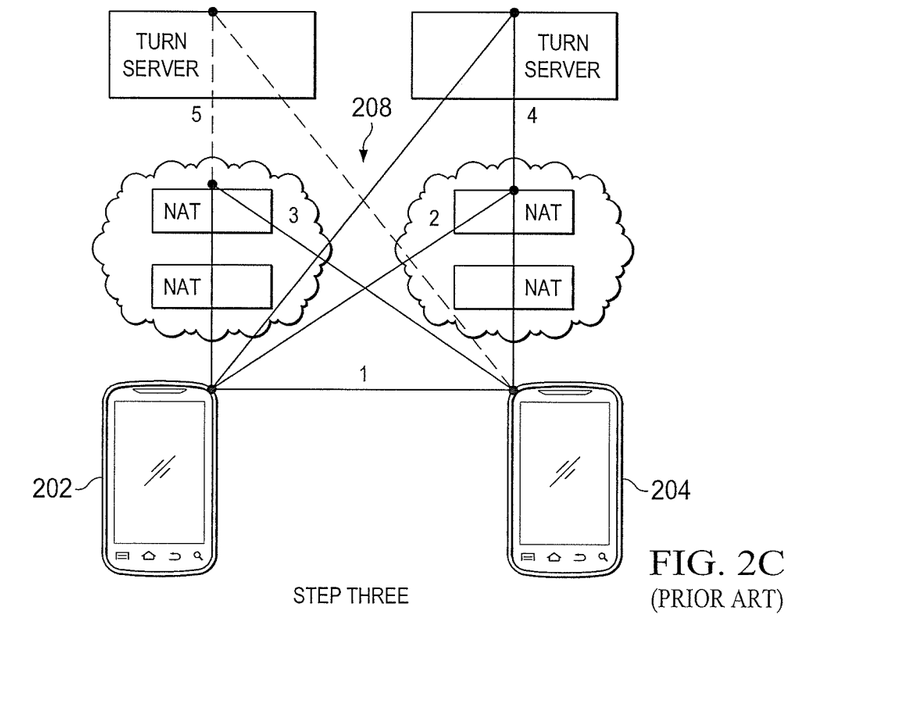

One solution to solve the above NAT/firewall issue is by using ICE/STUN/TURN. FIGS. 2A-2C illustrate simplified steps for ICE/STUN/TURN. As illustrated in FIG. 2A, during a first step, a first UE 202 collects its public and relay addresses by sending a request to a STUN or TURN server (shown as a TURN server 210 in FIG. 2A). As illustrated in FIG. 2B, during a second step, the first UE 202 sends collected media candidates to the peer or a second UE 204.

The peer or second UE 204 collects its public and relay addresses by sending a request to the TURN server 210 and sends collected media candidates to the first UE 202. As illustrated in FIG. 2C, during a third step, the first and second UEs 202, 204 check media paths 208 by sending connectivity check messages for each possible path and select a path that works.

Figure 3:
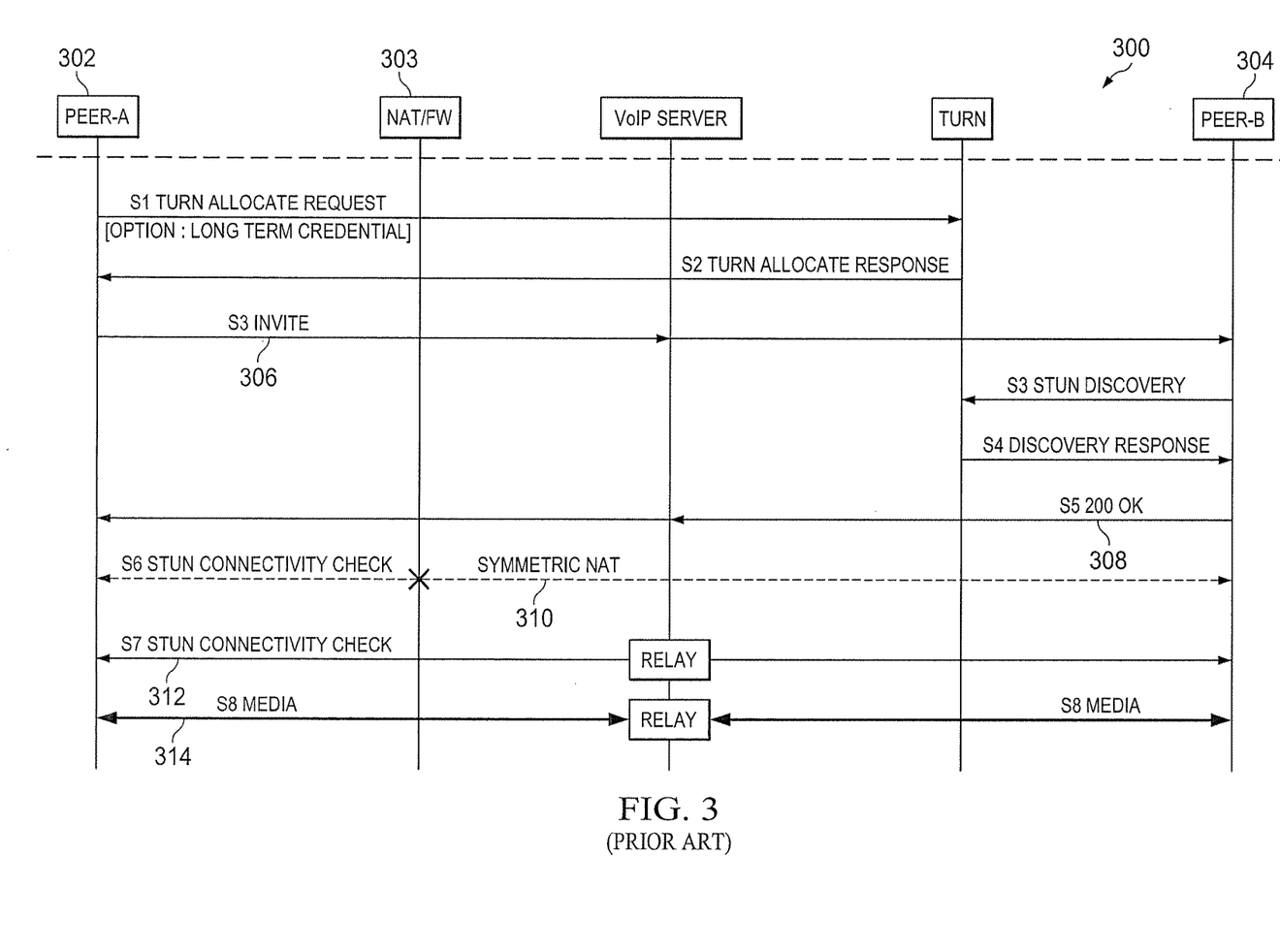
FIG. 3 illustrates an example VoIP call flow diagram using ICE/STUN/TURN.

FIG. 3 illustrates an example VoIP call flow 300 using ICE/STUN/TURN. In the illustrated example, two UEs 302, 304 collect candidate addresses (public and relay address), exchange media candidates through signaling messages (steps 306, 308), perform a connectivity check (steps 310, 312), and exchange media over a selected media path (step 314). Because UEs 302, 304 are behind a symmetric NAT 303, their connectivity check for public addresses fails (step 310). The UEs 302, 304 switch to use a TURN relay server 316 for media communication (step 312). The UE registration process is not shown in FIG. 3 for simplification.

ICE/STUN/TURN are among the most common NAT/Firewall traversal solutions for P2P communication and have recently been adopted by the World Wide Web Consortium (W3C) and the IETF for Web Real-Time Communication (WebRTC) as the required NAT traversal mechanism. WebRTC enables users to make voice or video calls with a web browser. Because browsers are readily available on most types of electronic devices (desktop, smart phone, tablet/pad, etc.), WebRTC is regarded as a disruptive technology because of its potential for large user bases and its ability to integrate voice/video with web applications. Therefore a scalable, secure, and efficient ICE/TURN/STUN solution is desirable.

There are several drawbacks with existing ICE/STUN/TURN solutions. One drawback is TURN credential provisioning. For example, the TURN standard defines a mechanism for user authentication using TURN long-term credentials. When a UE sends a request to the TURN server, the TURN server challenges the UE with a random value and the UE must send an authentication code computed with the shared credential to authenticate itself. This is critical for security. Otherwise, hackers can send a flood of requests to exhaust resources on the TURN server, e.g., relay addresses or table entries.

However, current standards do not specify how to provision the long-term credential to UEs. Common practices include:
  a. Manual configuration: this approach is not scalable to a large number of users, e.g., for WebRTC where credentials need to be configured for millions of users.
  b. Using device management channel: this approach only works for devices that support a device management function, e.g., smart phones. It does not work for WebRTC because browsers do not use device management functions.
  c. Shared user name/password: this approach only works when the number of users is small and is not secure when the number of users is large or for users that frequently join/leave a group, so it is not acceptable for service providers.
  d. Re-using other service credentials like WebRTC user name/password: this approach has several drawbacks:
    i. The TURN server may not know the service credentials (e.g., the TURN server belongs to a $3^{rd}$ party), so it is difficult to use this approach if the TURN server and the service credential belong to different parties or organizations;
    ii. Because the TURN user name and authentication code may be sent in clear text, using service credentials increases the risk of user name leakage and off-line password cracking attacks.

Several approaches have been proposed recently to IETF and other standard bodies regarding TURN credential management.
  a. RFC 7065 "Traversal Using Relays around NAT (TURN) Uniform Resource Identifiers" by M. Petit-Huguenin et al. This RFC defines the format to encode the TURN server address and protocols in a message, e.g., an HTTP response. But it does not define a mechanism to provision TURN credentials.
  b. Retrieve TURN credential by REST API calls to a web server. In this approach, a UE sends an HTTP request to a URL (API) on a web server to retrieve TURN parameters, including user name and password (credentials). However, this mechanism does not specify how the UE can be authenticated by the web server. For example, if the TURN server belongs to a $3^{rd}$ party, or if the web server does not have a user authentication function (e.g., users use IMS identity, not web identity, to access WebRTC services). Therefore, this approach only moves the authentication problem from the TURN server to the web server. Because there is no guarantee that the web server always authenticates a user, its applicability is limited and depends on the web server functions.
  c. OAuth Token Approach. In this approach, a TURN server redirects a user to authenticate to a WebRTC server first. The WebRTC server then returns an OAuth token, which is used by the UE to authenticate to a TURN server. Some of the drawbacks of this approach are that:
    I. The TURN protocol needs to be changed to send/process the OAuth token.
    II. The OAuth token may not be available in existing service architecture. For example, for WebRTC service, when a user uses IMS ID to authenticate, there is no OAuth token used according to the service architecture proposed by 3GPP. Therefore the existing architecture needs to be changed.
    III. Token leakage. Because TURN messages usually are sent without encryption, if the UE sends a token in the TURN message, it is possible for an attacker to eavesdrop or hack TURN messages and capture the OAuth token. This is a serious security issue that may be used by attackers to steal a user's identity or hijack sessions, etc.
  d. Provisioning TURN credential using VoIP signaling channel. In this approach, a user first authenticates to a VoIP/WebRTC server, and then the server returns a user name and password to the user. This approach has the advantage that it is secure because the user is authenticated by the WebRTC or the VoIP server during registration. This approach is also simple and scalable because it uses the scalability of the signaling channel. One drawback is that it does not explain how to send the generated credential to the TURN server (from the WebRTC or the VoIP server), and it does not support dynamic change of user credentials, e.g., for anonymous calls discussed below.

Because TURN messages are often sent in clear text, it is possible for an attacker or $3^{rd}$ party to find user call information by tracking the user name in TURN messages. This may reveal the user's call time, call destination (IP), call duration, etc. It is possible to reveal user call ID if attackers use active attack techniques, e.g., call a user first and analyze the TURN message from the user to find his TURN user name, etc. Therefore, it may be desirable to change the TURN user name regularly. For example, it is desirable to change the TURN user name to a different user name for anonymous calls. Current approaches do not allow the user to retrieve a new TURN user name for anonymous calls or change user names regularly to avoid privacy issues.

According to the present disclosure, a method to provision TURN credentials (e.g., user name/password) using a VoIP/WebRTC signaling channel is provided. The method provides a mechanism to manage credentials between the signaling gateway (e.g., the VoIP/WebRTC signaling gateway) and the TURN server. The method provides a mechanism to handle users for different realms. The method provides a mechanism to control credential expiration time and credential revocation. The method provides a mechanism to renew a credential anytime by the ED, e.g., before anonymous calls, to protect user privacy. The method provides a mechanism to retrieve TURN servers dynamically, e.g., based on network condition or security issues.

Figure 4:
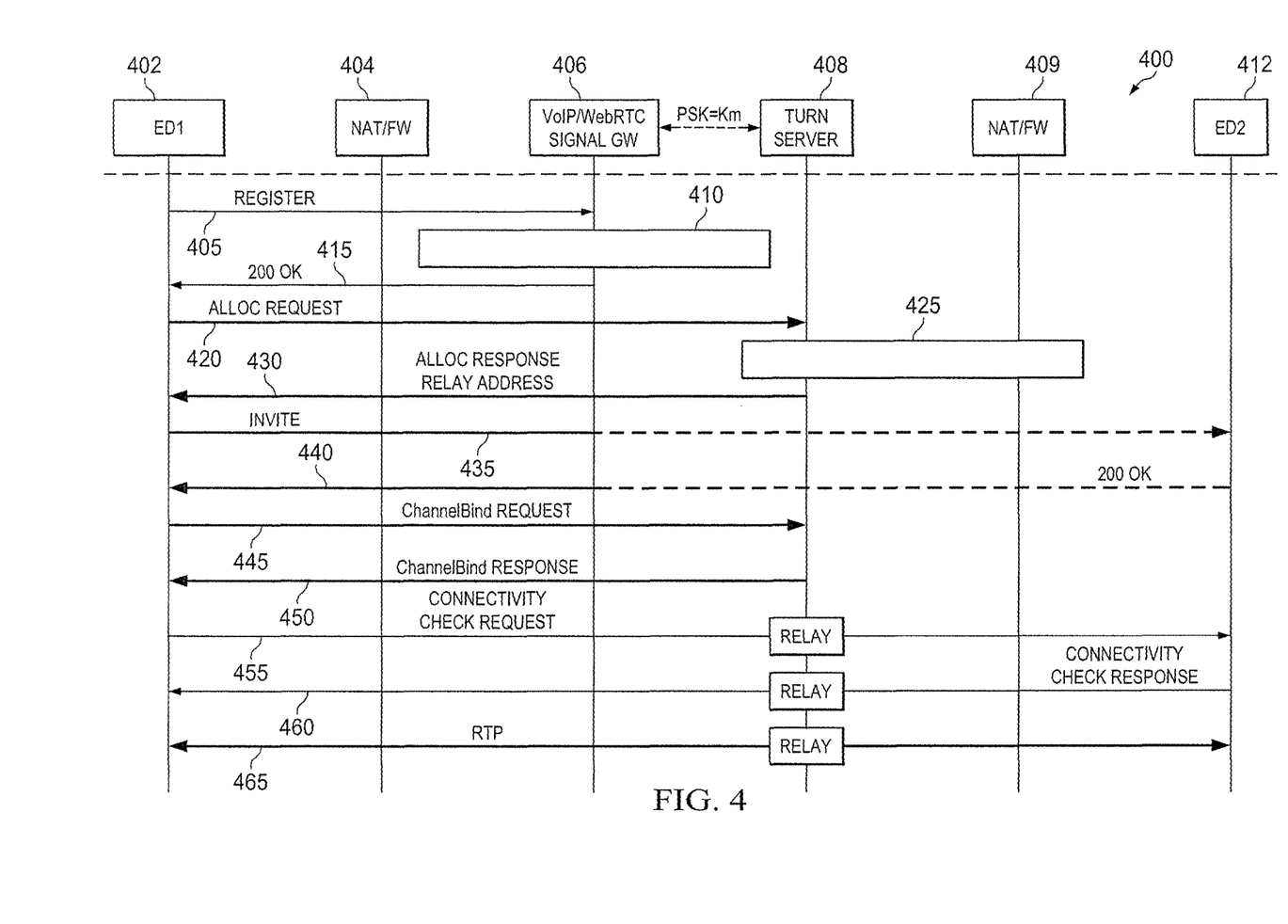
FIG. 4 illustrates a call flow diagram of a system for provisioning TURN credentials and servers for NAT/FW traversal via a VoIP/WebRTC signaling channel according to one embodiment.

An embodiment of a system 400 for provisioning TURN credentials and servers for NAT/FW traversal via a VoIP/WebRTC signaling channel in accordance with the present disclosure is described with reference to the call flow diagram of FIG. 4. The system 400 includes a first electronic device (ED) 402, a first NAT/Firewall 404, a signaling gateway 406 such as a VoIP/WebRTC signaling gateway, a second NAT/Firewall 409, a TURN server 408, and a second ED 412. The signaling gateway 406 may integrate signaling, media, and TURN functions together. The first and second EDs 402, 412 are configured to operate and/or communicate in the system 400. For example, the EDs 402, 412 are configured to transmit and/or receive wireless signals or wired signals. Each ED 402, 412 represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device. An example signaling protocol used in the system is Session Initiation Protocol over WebSocket (SIP over WS).

The signaling gateway 406 may include an operating system that provides executable program instructions for the general administration and operation of that gateway, and typically will include a computer-readable medium storing instructions that, when executed by a processor of the signaling gateway 406, allow the signaling gateway 406 to perform its intended functions. Suitable implementations for the operating system and general functionality of the signaling gateway is known or commercially available, and are readily implemented by persons having ordinary skill in the art.

When the first ED 402 registers with the signaling gateway 406, such as a VoIp signaling server (e.g., Proxy Call Session Control Function (P-CSCF)) or a WebRTC signaling server (e.g., eP-CSCF), it sends a REGISTER (e.g., REGISTER for SIP SIP over WS) or other registration or authentication message that comprises a TURN credential provision request and one or more parameters, such as a "tun-cred" parameter, to request the signaling gateway 406 to provide TURN credentials to the first ED 402 (step 405). The format of the "tun-cred" parameter is:

"tun-cred:[realm=value;] [exp=value;] [revoke;]" where:
(a) a "realm" parameter is optional and if present, requests a credential for the specific realm; (b) an "exp" parameter is optional and if present, requests a credential for the specified expiration time; and (c) a "revoke" parameter is optional and if present, requests the signaling gateway 406 to revoke previously generated credentials.

When the signaling gateway 406 receives the registration message with the "tun-cred" parameter, it validates the "tun-cred" parameter and selects the realm and TURN server for the realm. For example, the signaling gateway 406 may determine that the format of the realm is recognized, that the realm is recognized, that a value of the expiration time is not negative or infinite, etc. The realm may be a string used to describe the server or a context within the server and may tell a client device which username and password combination to use to authenticate requests. The signaling gateway 406 then generates a user portion of the TURN credential (TURN-USR) (step 410). The user portion of the TURN credential (TURN-USR) may be in the following format:

"Turn-USR=user-name[@realm-value;] [exp=value;] [revoke;]," where:
(a) "user-name" is the user name portion of the TURN credential;
(b) "realm-value" is optional and specifies the realm of the user;
(c) the "exp" value is optional and specifies the expiration time for the credential; and
(d) the "revoke" keyword is optional and indicates to the TURN server to revoke all TURN credentials generated before this credential.

The signaling gateway 406 identifies a pre-shared key ($k_m$) for the selected TURN server and generates a password portion of the TURN credential (TURN-PWD) by hashing the user portion of the credential using the pre-shared key (step 410). The password portion of the TURN credential (TURN-PWD) may be in the following format:

"TURN-PWD=hmac (TURN-USR, pre-shared-key)"

The signaling gateway 406 sends the generated TURN credential (TURN-USR and TURN-PWD) to the first ED 402 in a response to the registration message (e.g., "200 OK" for SIP) (step 415). The result may be encoded as: "tur-cred=usr-name@realm;exp=val;revoke;tur-pwd=turn-password."Those of skill in the art will recognize that other formats may also be used.

The first ED 402 receives the response for registration with TURN credential from the signaling gateway 406 and uses the TURN credential to request a TURN relay address. The first ED 402 uses the entire string of TURN-USR as the TURN user name (that is, it includes the user-name@realm; exp-value;revoke) in its allocation (Alloc) request and uses the TURN-PWD to generate the message authentication code (MAC) for the Alloc request (step 420).

The TURN server 408 receives the Alloc request from the first ED 402, parses the user string (e.g., user-name@realm; exp-value; revoke), and extracts the TURN user name, the realm, the expiration time, and the revoke keyword (step 425). The TURN server 408 validates the extracted values and discards the request if the parameters are invalid (e.g., unknown or unrecognized format of the realm, unknown or unrecognized realm, negative expiration time, etc.). The TURN server 408 identifies the pre-shared key from the realm and calculates the TURN-PWD by hashing the received TURN user string in the Alloc request with the pre-shared key (step 425). The TURN server 408 uses the TURN-PWD generated by hashing the received TURN user string in the Alloc request with the pre-shared key to validate the received message. If the user string in the Alloc request includes the revoke keyword, the TURN server 408 revokes previously received unexpired credentials (e.g., using a local cache to record unexpired credentials for a user and the status of the credential). If a credential is revoked, it is rejected by the TURN server 408. After the received message is validated, the TURN server 408 sends an Alloc response including a relay address to the first ED 402 (step 430).

If the first ED receives a relay address from TURN server, it proceeds to make calls using existing protocols or procedures, e.g., the first ED 402 sends an INVITE request (step 435) to the signaling gateway 406 to initiate a call. The signaling gateway 406 receives the INVITE request from the first ED 402 and checks whether the call can proceed. If the call cannot proceed, e.g., the called party (e.g., the second ED 412) is not registered or not online, the signaling gateway 406 returns an error code to the first ED 402 (not shown) and terminates the call.

If the call can proceed, the signaling gateway 406 forwards the INVITE message to the called party (e.g., the second ED 412) (step 435). The called party (e.g., the second ED 412) receives the INVITE message, processes the INVITE message, and sends a response message (e.g., a "200 OK" message) to the signaling gateway 406. The signaling gateway 406 forwards the response message to the first ED 402 (step 440). Each of the EDs 402, 412 is behind a respective symmetric NAT/Firewall 404, 409.

The first ED 402 receives the response message and sends a ChannelBind request to the TURN server 408 to reserve a channel (step 445). The TURN server 408 receives the ChannelBind request and sends a ChannelBind response to the first ED 402 (step 450). After the channel is set up, the first and second EDs 402, 412 can exchange messages for a connectivity check (e.g., using STUN binding requests). For example, the TURN server 408 receives data from the first ED 402 via a connectivity check request message and relays the data to the second ED 412 (step 455). The second ED 412 receives the data and responds via a connectivity check response message. The TURN server 408 receives the connectivity check response message and relays the data therein to the first ED 402 (step 460). Thereafter, the first and second EDs 402, 412 find a media path and start sending media packets to each other, such as via Real-time Transport Protocol (RTP) (step 465).

Figure 5:
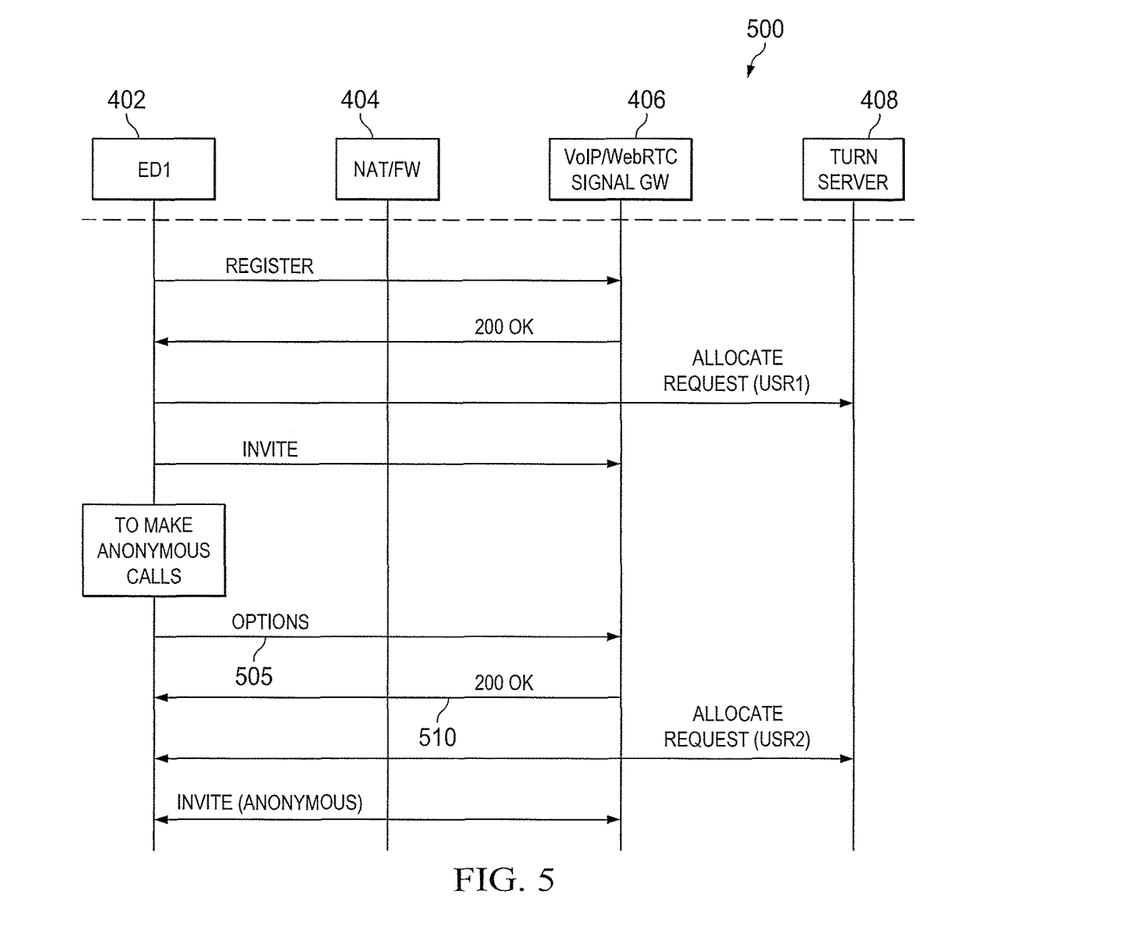
FIG. 5 illustrates a call flow diagram of a system for dynamic TURN server provisioning or dynamic TURN credential provisioning according to one embodiment.

FIG. 5 is a call flow diagram illustrating a system 500 for dynamic TURN server provisioning or dynamic TURN credential provisioning. As illustrated in the call flow diagram of FIG. 5, the first ED 402 requests TURN credentials in its initial registration message (e.g., REGISTER). The registration message may include the "tun-cred" parameter as described above with respect to FIG. 4. The signaling gateway 406 identifies the realm of the user, selects one or a list of TURN servers, and sends the selected TURN credential to the first ED 402 in its response (e.g., "200 OK" for SIP). If the first ED receives a relay address from the TURN server 408, it proceeds to make calls using existing protocols or procedures, e.g., the first ED 402 sends an INVITE request to the signaling gateway 406 to initiate a call as explained above with respect to FIG. 4.

The signaling gateway 406 may be configured to dynamically renew a credential, e.g., before anonymous calls or to avoid using one credential for too long, to protect user privacy. To receive a new TURN user name and password before the next registration cycle, (e.g., before making an anonymous call), the first ED 402 sends an update request such as an OPTION or INFORM request to the signaling gateway 406 that includes a parameter such as the "tur-cred" parameter as described above with respect to FIG. 4 (step 505). The format of the "tur-cred" parameter is the same as explained above with respect to FIG. 4. The signaling gateway 406 validates the user request and generates anew TURN credential (e.g., TURN-USR and TURN-PWD) as explained above with respect to FIG. 4. The signaling server 406 sends the new credential back to the first ED 402 in the response to the OPTION or INFORM request (e.g., "200 OK" in SIP) (step 510). The first ED 402 receives the new TURN credential from the signaling gateway 406 and uses the new TURN credential to make anonymous calls.

Alternatively, or in addition, the signaling gateway 406 may be configured to support re-selection of a TURN server based on a network condition (e.g., quality of service (QoS)) or a security condition. For example, if the first ED 402 detects a TURN server issue (e.g., QoS or security) such as the previously received TURN server not responding to its requests, the first ED 402 may send an update request such as the OPTION or INFORM request to the signaling gateway 406 that includes a parameter such as the "tur-serv" parameter in step 505. The update request may contain a reason code that indicates why the first ED needs a new TURN server. The signaling gateway 406 validates the user request, selects a new TURN server or TURN servers based on its knowledge of the operational status of other TURN servers in the communication system and the feedback from the first ED 402, and sends a new TURN server list back to the first ED 402 in the response to the OPTION or INFORM request (e.g., "200 OK" in SIP) (step 510). The first ED 402 receives the new TURN server list from the signaling gateway 406 and selects a new TURN server.

Figure 6:
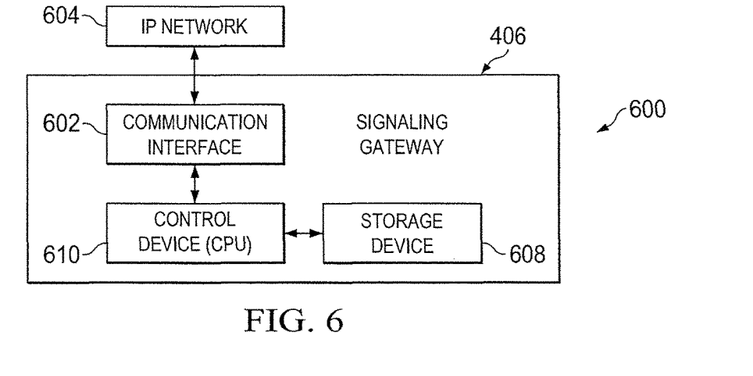
FIG. 6 illustrates a block diagram of a signaling gateway according to one embodiment.

FIG. 6 illustrates a block diagram of the signaling gateway 406. In a particular embodiment, the signaling gateway 406 is composed of a server computer such as an SIP server, H.323 server, or the like. As shown in FIG. 6, in its hardware configuration, the signaling gateway 406 includes, for example, a communication interface 602 coupled to an IP network 604, an operating system (not shown), a storage device 608 for storing programs to serve as a server such as a VoIP server, and a control device 610 (e.g., a processor or CPU) which executes a program in the storage device 608 to control the entire operations.

The storage device 608 may include, for example, an OS, a communication protocol stack which controls data communication based on IP packets, a database, control programs, for example, call control protocols such as H.323, SIP, or the like which defines voice communication procedures (e.g., making and receiving calls), and a server program which defines processing procedures for the NAT and firewall traversal method.

The control device 610 may be a general purpose, special purpose or digital signal processor, and may be a plurality of processors or combination of such processors. The control device 610 includes functionality to perform signal coding, data processing, input/output processing, and/or any other functionality enabling the signaling gateway 406 to operate in the system 400 or the system 500. In addition, the control device 610 is coupled to the storage device 608 operable for storing and retrieving data. Any suitable type of memory storage device may be included, such as random-access memory (RAM), read-only memory (ROM), hard disk, subscriber identity module (SIM) card, a memory stick, a secure digital (SD) memory card, and the like.

Figure 7:
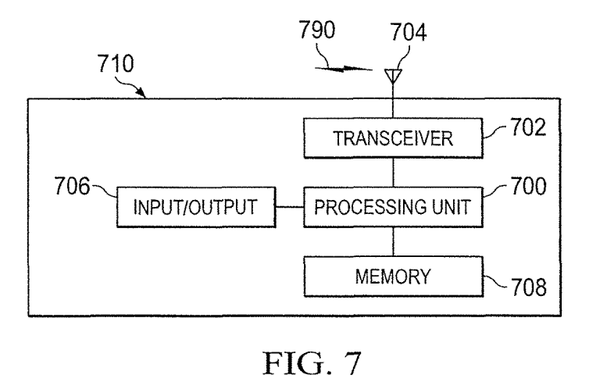
FIG. 7 illustrates a block diagram of an electronic device (ED) according to one embodiment.

FIG. 7 illustrates a block diagram of an example electronic device (ED) or User Equipment (UE). The electronic device 710 may be, for example, a portable wireless electronic device. For example, the electronic device 710 may be a cellular telephone, a media player with wireless communications capabilities, a handheld computer (also sometimes called a personal digital assistant), a remote controller, a global positioning system (GPS) device, a tablet computer, and a handheld gaming device. The electronic device 710 includes a processor 700, a transceiver 702, an antenna element 704, one or more input/output devices 706 (e.g., speaker/microphone, keypad, display/touchpad) and memory 708. The electronic device 710 may be wirelessly coupled to a base station (not shown) via a wireless link 790.

The electronic device 710 may include one or more other components, devices, or functionalities (not shown). It will be understood that the electronic device 710 may include fewer or more of the foregoing described elements.

The processor 700 may be a general purpose, special purpose or digital signal processor, and may be a plurality of processors or combination of such processors. The processor 700 includes functionality to perform signal coding, data processing, power control, input/output processing, and/or any other functionality enabling the electronic device 710 to operate in the system 400 or the system 500. The processor 700 is coupled to the transceiver 702 which is coupled to the antenna element 704. It will be understood that the processor 700 and the transceiver 702 may be separate components or integrated together. Similarly, the antenna element 704 may be a single element or a number of elements (multiple antennas or elements).

The transceiver 702 is configured to modulate the data or signals for transmission by the antenna 704 and demodulate the data or signals received by the antenna 704.

The processor 700 is coupled to the one or more input/output devices 706 (including ports or busses) operable for inputting/outputting user data. In addition, the processor 700 is coupled to memory 708 operable for storing and retrieving data. Any suitable type of memory storage device may be included, such as random-access memory (RAM), read-only memory (ROM), hard disk, subscriber identity module (SIM) card, a memory stick, a secure digital (SD) memory card, and the like.

Other elements or devices that might be included within the electronic device 710 will not be described herein, unless necessary or relevant to an understanding of the present disclosure.

Figure 8:
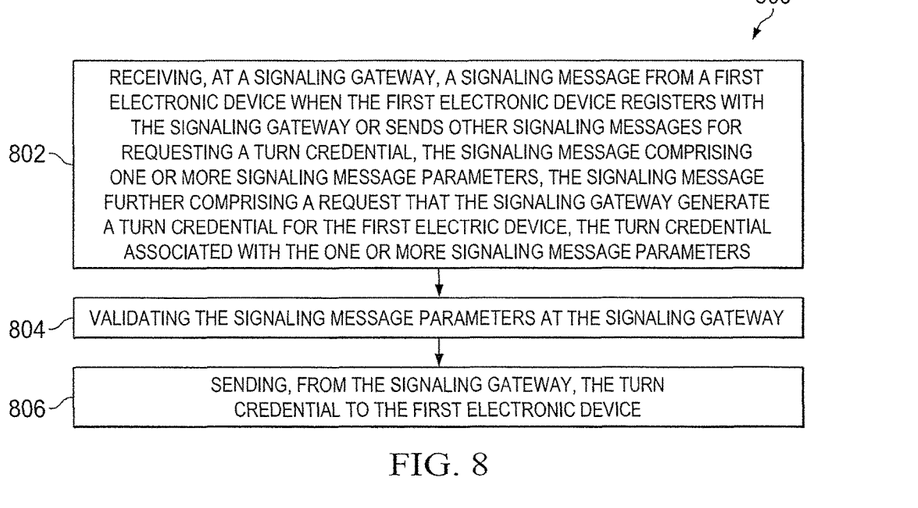
FIG. 8 illustrates a flow diagram illustrating a method of NAT traversal according to one embodiment.

FIG. 8 illustrates a flow diagram illustrating a method 800 for traversal using relays around network address translation (TURN) credential and server provisioning in a communication system according to one embodiment. The method comprises receiving, at a signaling gateway, a signaling message from a first electronic device when the first electronic device registers or authenticates with the signaling gateway, at step 802. The signaling message comprises one or more signaling message parameters. The signaling message further comprises a request that the signaling gateway generate a TURN credential for the first electronic device. The TURN credential is associated with the one or more signaling message parameters. For example, the registration message from the first electronic device 402 is received at the signaling gateway 406 (step 405). The registration message includes a TURN credential provision request parameter, and may include parameters such as the realm parameter, the expiration parameter, and the revoke parameter.

The signaling message parameters are validated at the signaling gateway, at step 804. For example, the registration message is validated by the signaling gateway 406 (step 410). To illustrate, the signaling gateway 406 validates the realm parameter "realm" (if present) against its security policies and discards requests with an invalid realm value. If the realm parameter is not present, the signaling gateway chooses a default realm. The signaling gateway 406 validates the expiration parameter "exp" (if present) and discards requests with an invalid value. If the expiration parameter is not present, the signaling gateway chooses an expiration value, such as an expiration value of the authentication message (e.g., the REGISTER message).

The TURN credential is sent to the first electronic device by the signaling gateway, at step 806. For example, the signaling gateway 406 sends the TURN credential in its response message "200 OK" to the first electronic device 402 (step 415).

One of the advantages of the present disclosure is that the signaling gateway authenticates users during the registration process, ensuring that only authenticated users can receive TURN credentials. Other approaches like OAuth Token or REST API use web servers to distribute TURN credentials. Web servers may or may not authenticate users. For example, in a 3GPP defined WebRTC architecture, the web server only hosts WebRTC JS code but will not authenticate users when an IMS identity is used to access the WebRTC service. In such case, the signaling gateway based approach is more secure than the web server based approach.

Another advantage of the present disclosure is that the signaling gateway based approach reuses existing ICE/TURN protocols with little to no change or addition of new interfaces. This approach does not need extra steps to verify TURN credentials (e.g., steps to verify token in the OAuth solution), thereby needing less overhead to implement and operate.

Another advantage of the present disclosure is that the signaling gateway based approach allows the ED to retrieve new credentials for anonymous calls to avoid call information leakage via analysis of the TURN user name, thereby providing more protection on user privacy than other approaches.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for traversal using relays around network address translation (TURN) credential and server provisioning in a communication system, the communication system comprising a signaling gateway, a TURN server, and an electronic device, the method comprising:
   receiving, at the signaling gateway, a signaling message from a first electronic device (ED) when the first electronic device registers with the signaling gateway or sends other signaling messages for requesting a TURN credential, the signaling message comprising one or more signaling message parameters, the signaling message further comprising:
   a request that the signaling gateway generate a TURN credential for the first ED, the TURN credential associated with the one or more signaling message parameters, wherein the TURN credential generated by the signaling gateway identifies the TURN server and includes a hashed user portion having a user name and, wherein the signaling gateway uses a key that is pre-shared with the TURN server to hash the user portion to generate a password portion of the TURN credential by hashing the user portion of the TURN credential using the pre-shared key;
   sending, from the signaling gateway, the TURN credential to the first ED as part of a request for a TURN relay address such that the TURN credential is useable by the first ED to obtain the relay address from the TURN server; and
   in response to the signaling message comprising a realm parameter, requesting a credential for a realm defined by the realm parameter wherein the realm parameter identifies the user name and password combination to authenticate requests.

2. The method in accordance with claim 1, further comprising:
   validating the one or more signaling message parameters; and
   selecting the realm and a TURN server for the realm based on the signaling message.

3. The method in accordance with claim 2, further comprising:
   in response to the signaling message comprising an expiration parameter, requesting a credential for an expiration time defined by the expiration parameter; and
   in response to the signaling message comprising a revoke parameter, requesting the signaling gateway to revoke previously generated credentials.

4. The method in accordance with claim 2, further comprising:
   in response to the user portion comprising a user portion realm parameter, generating a realm of the user defined by the user portion realm parameter;
   in response to the user portion comprising a user portion expiration parameter, generating a user portion expiration time defined by the user portion expiration parameter; and
   in response to the user portion comprising a user portion revoke parameter, sending an indication to the TURN server to revoke previously generated TURN credentials.

5. The method in accordance with claim 4, further comprising:
   in response to determining that the signaling gateway and the TURN server have a shared key, generating the password portion of the TURN credential by hashing the user portion of the TURN credential with the shared key.

6. The method in accordance with claim 5, further comprising:
   after the TURN credential is received by the first ED, receiving, by the TURN server, an allocation request from the first ED, the allocation request comprising a request for a TURN relay address and one or more allocation request parameter values, the one or more allocation request parameter values based on the user portion of the TURN credential and the password portion of the TURN credential, the method further comprising:
   at the TURN server:
      receiving the allocation request from the first ED, the allocation request comprising a message authentication code based on the password portion of the TURN credential;
      extracting the one or more allocation request parameter values from the allocation request;
      validating the one or more extracted allocation request parameter values; and
      discarding the allocation request if one or more of the one or more allocation request parameter values is invalid.

7. The method in accordance with claim 6, further comprising:
   identifying the shared key;
   generating a TURN server password by hashing the one or more allocation request parameter values based on the user portion of the TURN credential with the shared key; and
   validating the received allocation request using the TURN server password.

8. The method in accordance with claim 6, further comprising:
   in response to the allocation request comprising a revoke parameter:
      revoking previously received TURN credentials; and
      rejecting the revoked credentials.

9. The method in accordance with claim 8, further comprising:
   receiving, at the signaling gateway, an update request for a second TURN credential for the first ED different than the TURN credential, the update request received prior to expiration of a registration cycle time of the signaling message;
   validating the update request at the signaling gateway; and
   sending the second TURN credential to the first ED.

10. The method in accordance with claim 9, further comprising:
    receiving the second TURN credential at the first ED; and
    using the second TURN credential to make anonymous calls.

11. The method in accordance with claim 8, further comprising:
    receiving, at the signaling gateway, an update request to provision a second TURN server for the first ED, the update request received prior to expiration of a registration cycle time of the signaling message, wherein the update request is based on a network condition or a security condition, the method further comprising:
    validating the update request at the signaling gateway;
    generating a second TURN credential for the first ED; and
    sending the second TURN credential to the first ED.

12. The method in accordance with claim 11, further comprising:
    receiving the second TURN credential at the first ED; and
    using the second TURN server to make calls.

13. An electronic device for traversal using relays around network address translation (TURN) credential and server provisioning in a communication system, the communication system comprising the electronic device, a signaling gateway, and a TURN server, the electronic device comprising:
a processor; and
memory coupled to the processor; wherein the electronic device is configured to:
send, to the signaling gateway, a signaling message, the signaling message comprising:
one or more signaling message parameters, the signaling message further comprising a request that the signaling gateway generate a TURN credential for the first ED, the TURN credential associated with the one or more signaling message parameters, wherein the TURN credential generated by the signaling gateway identifies the TURN server and includes a hashed user portion having a user name, wherein the signaling gateway uses a key that is pre-shared with the TURN server to hash the user portion to generate a password portion of the TURN credential by hashing the user portion of the TURN credential using the pre-shared key;
receive, from the signaling gateway, the TURN credential as part of a request for a TURN relay address such that the TURN credential is useable by the first ED to obtain the relay address from the TURN server; and
in response to the signaling message comprising a realm parameter, request a credential for a realm defined by the realm parameter wherein the realm parameter identifies the user name and password combination to authenticate requests.

14. The electronic device in accordance with claim 13, wherein the electronic device is further configured to:
in response to the signaling message comprising an expiration parameter, request a credential for an expiration time defined by the expiration parameter; and
in response to the signaling message comprising a revoke parameter, request the signaling gateway to revoke previously generated credentials.

15. The electronic device in accordance with claim 14, wherein the electronic device is further configured to:
after receiving the TURN credential, send an allocation request to a first TURN server selected based on the signaling message, the first TURN server coupled to the signaling gateway, the allocation request comprising a request for a TURN relay address.

16. The electronic device in accordance with claim 15, wherein the electronic device is further configured to:
send an update request for a second TURN credential for the first ED different than the TURN credential, the update request sent prior to expiration of a registration cycle time of the signaling message;
receive the second TURN credential; and
use the second TURN credential to make anonymous calls.

17. The electronic device in accordance with claim 15, wherein the electronic device is further configured to:
send an update request for a second TURN server for the first ED different than the first TURN server, wherein the update request is based on a network condition or a security condition, wherein the update request is sent prior to expiration of a registration cycle time of the signaling message;
receive a second TURN credential; and
use the second TURN server to make calls.

18. A signaling gateway for traversal using relays around network address translation (TURN) credential and server provisioning in a communication system, the communication system comprising the signaling gateway, a TURN server, and an electronic device, the signaling gateway comprising:
a processor; and
memory coupled to the processor;
wherein the signaling gateway is configured to:
receive a signaling message from a first electronic device (ED), the signaling message comprising:
one or more signaling message parameters, the signaling message further comprising a request that the signaling gateway generate a TURN credential for the first ED, the TURN credential associated with the one or more signaling message parameters, wherein the TURN credential generated by the signaling gateway identifies the TURN server and includes a hashed user portion having a user name, wherein the signaling gateway uses a key that is pre-shared with the TURN server to hash the user portion to generate a password portion of the TURN credential by hashing the user portion of the TURN credential using the pre-shared key;
send the TURN credential to the first electronic device as part of a request for a TURN relay address such that the TURN credential is useable by the first ED to obtain the relay address from the TURN server; and
in response to the signaling message comprising a realm parameter, generate a credential for a realm defined by the realm parameter wherein the realm parameter identifies the user name and password combination to authenticate requests.

19. The signaling gateway in accordance with claim 18, wherein the signaling gateway is further configured to:
validate the one or more signaling message parameters; and
select the realm and a TURN server for the realm based on the signaling message.

20. The signaling gateway in accordance with claim 19, wherein the signaling gateway is further configured to:
in response to the signaling message comprising an expiration parameter, generate a credential for an expiration time defined by the expiration parameter; and
in response to the signaling message comprising a revoke parameter, revoke previously generated credentials.

21. The signaling gateway in accordance with claim 20, wherein the TURN credential comprises a user portion and a password portion, the signaling gateway further configured to:
generate the user portion of the TURN credential.

22. The signaling gateway in accordance with claim 21, wherein the signaling gateway is further configured to:
in response to the user portion comprising a user portion realm parameter, generate a realm of the user defined by the user portion realm parameter.

23. The signaling gateway in accordance with claim 22, wherein the signaling gateway is further configured to:
in response to the user portion comprising a user portion expiration parameter, generate a user portion expiration time defined by the expiration parameter; and
in response to the user portion comprising a user portion revoke parameter, send an indication to the TURN server to revoke previously generated TURN credentials.

24. The signaling gateway in accordance with claim 23, wherein the signaling gateway is further configured to:
determine that the signaling gateway and the TURN server have a shared key; and
generate the password portion of the TURN credential by hashing the user portion of the TURN credential with the shared key.

25. The signaling gateway in accordance with claim 24, wherein the signaling gateway is further configured to:
- receive an update request for a second TURN credential for the first ED different than the TURN credential, the update request received prior to expiration of a registration cycle time of the signaling message;
- validate the update request; and
- send the second TURN credential to the first ED.

26. The signaling gateway in accordance with claim 24, wherein the signaling gateway is further configured to:
- receive an update request to provision a second TURN server for the first ED, the update request received prior to expiration of a registration cycle time of the signaling message, wherein the update request is based on a network condition or a security condition;
- validate the update request; and
- send the second TURN server to the first ED.

* * * * *

UNITED STATES PATENT AND TRADEMARK OFFICE
CERTIFICATE OF CORRECTION

| | | |
|---|---|---|
| PATENT NO. | : 9,621,518 B2 | Page 1 of 1 |
| APPLICATION NO. | : 14/461162 | |
| DATED | : April 11, 2017 | |
| INVENTOR(S) | : Wang et al. | |

It is certified that error appears in the above-identified patent and that said Letters Patent is hereby corrected as shown below:

In Column 8, Line 1, delete "anew" and insert --a new-- therefor

Signed and Sealed this
Tenth Day of April, 2018

Andrei Iancu
*Director of the United States Patent and Trademark Office*